June 3, 1947. L. G. JENNESS 2,421,381
CHEMICAL PRODUCTION OF OXYGEN
Filed July 3, 1942
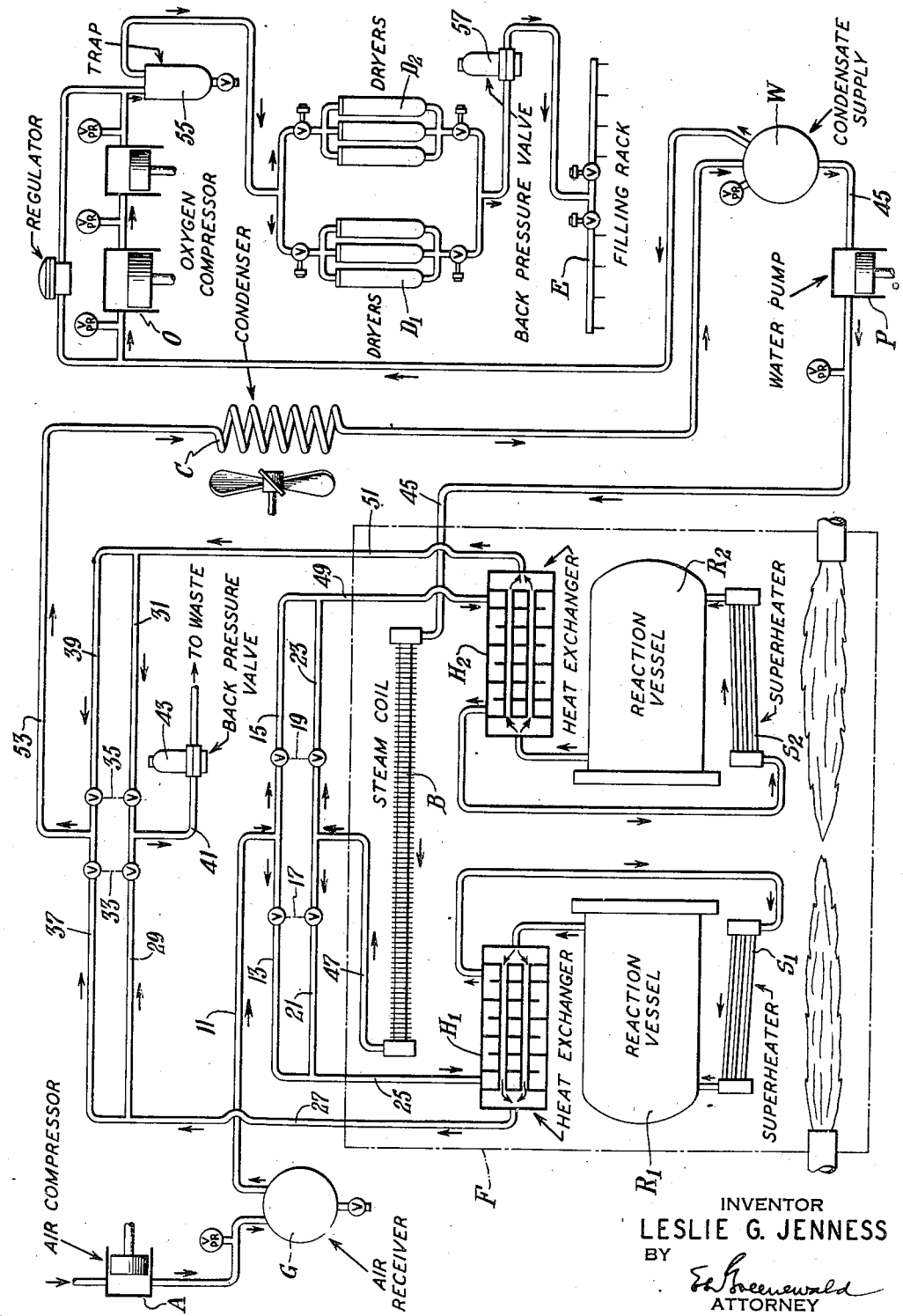
INVENTOR
LESLIE G. JENNESS
BY
EdGreenewald
ATTORNEY Patented June 3, 1947

2,421,381

UNITED STATES PATENT OFFICE 2,421,381

CHEMICAL PRODUCTION OF OXYGEN

Leslie G. Jenness, Buffalo, N. Y., assignor to The Linde Air Products Company, a corporation of Ohio Application July 3, 1942, Serial No. 449,687

8 Claims. (Cl. 23—221)

This invention relates to a novel chemical process for extracting oxygen from a mixture of oxygen with inert gas, and particularly for separating and collecting gaseous oxygen of high purity from the atmosphere. More particularly, the invention relates to an improvement on the basic process of Du Motay and Marechal disclosed in United States Patent 70,705 of November 12, 1867. The invention is also concerned with a novel process for reactivating a contact mass which has become exhausted during its use in the process for producing oxygen.

The process of Du Motay et al. is performed by alternately passing air and steam through a closed retort over a hot alkali manganate or similar reaction mass having the ability to be oxidized by the passage of air thereover, and thereafter to be deoxidized and release the gaseous oxygen during the passage of steam thereover. The reversible reaction theoretically is:

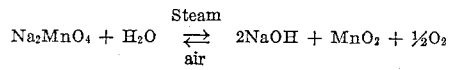

$$Na_2MnO_4 + H_2O \underset{\text{air}}{\overset{\text{Steam}}{\rightleftarrows}} 2NaOH + MnO_2 + \tfrac{1}{2}O_2$$

Various reaction masses may be used in the process, as disclosed by Du Motay et al., including the manganates and permanganates of potassium, sodium, or barium, as well as the chromates and ferrates of these metals, and in general all metallic acids or oxides forming, with potassium, sodium, or barium, binary combinations capable of becoming super-oxidized, and also possessing the property of releasing their oxygen at a temperature more or less elevated when they are placed in the presence of a current of steam. During the passage of steam over the hot mass, the gaseous oxygen is collected while the residual steam is condensed and separated from the oxygen. Oxygen of 95% purity or better may be obtained by this process. Of course the nitrogen residue from the air phase of the cycle also may be collected, if this is desired.

The basic process of Du Motay et al. has not been commercially successful in competition with other methods of producing oxygen because of several disadvantages rendering the process economically unprofitable. One of the principal drawbacks of the Du Motay et al. process is the instability of the reaction mass, which deteriorates rapidly after being in service only a short time, with a resulting low oxygen production based on the quantities of air and steam passed over the mass. Moreover, the process would consume huge quantities of steam for the production of oxygen on a large scale, thus making the cost of operation prohibitive. Another serious disadvantage is the relatively great size and cost of the equipment and plant required for producing oxygen on a large scale, necessitating a large initial investment.

Several attempts have been made by subsequent investigators to improve the fundamental Du Motay et al. process to permit the production of oxygen economically. Development has been mainly aimed at improving the physical or chemical character of the reaction mass for better stability and greater efficiency of oxygen production. Among the best known of these improvements was proposed by George Kaszner in United States Patent 1,015,566, of January 23, 1912, which teaches the addition to the alkali manganate mass of an alkali meta-plumbate, such as sodium meta-plumbate, for increased stability. Despite the alleged improvement in the stability of the reaction mass, however, there is no substantial increase in the efficiency of oxygen production based on the quantities of steam and air supplied to the mass. Thus, the cost of operation by Kaszner's process is prohibitive in competition with other commercial processes for producing oxygen.

The principal object of the present invention is to provide a novel chemical process for extracting oxygen from a mixture of oxygen with inert gas, and particularly for producing oxygen from the air without the disadvantages of the prior processes discussed above. Another object is the provision of a novel process for producing oxygen by the alternate passage of air and steam over a hot reaction mass, in which large quantities of oxygen may be produced with a relatively small quantity of mass and a relatively low steam consumption. Another object is the provision of such a process whereby the stability of the reaction mass is improved. Still another object is the provision of such a process whereby oxygen may be produced on a large scale with equipment of relatively small size requiring a relatively small initial investment. Still another object is the provision of such a process for producing oxygen from the air at a relatively low cost. Another object is the provision of a novel process for reactivating an inactive contact mass.

The above and other objects, and the novel features of the invention, will become apparent from the following description of the process, having reference to the single figure of the drawing, which is a flow sheet showing diagrammatically one form of apparatus for performing the process of the invention.

Fundamentally, the improvement of the present invention over the basic process of Du Motay et al. resides in the discovery that greatly improved yields of oxygen of high purity are obtained by maintaining the flowing streams of air and steam at pressures above about two atmospheres absolute during their respective periods of passage over the hot contact mass. This is in marked contrast to the processes of the prior art, in which the air and steam were at atmospheric pressure, or at most, at a low pressure just sufficient to force the steam and air through the mass. Moreover, pressure operation also improves the stability of the mass itself, thus permitting the same mass to be kept in operation for a much longer time than was possible by prior known processes.

The oxygen production is directly proportional to the absolute atmospheres of steam pressure, so that any slight increase of steam pressure above one atmosphere is beneficial. It is important, however, that the super-atmospheric pressure at least be maintained throughout the mass for the best results, and that the pressure be substantially greater than is required merely to force the steam through the mass. For practical purposes, of course, the operating pressure should exceed one atmosphere by a substantial amount. At about two atmospheres steam pressure (about 14.7 pounds per square inch gauge), the oxygen production is approximately twice that at one atmosphere under otherwise identical conditions.

One form of apparatus suitable for performing the process of the invention is shown diagrammatically in the drawing. A furnace F fired by gasoline or any other suitable fuel, has two reaction vessels $R_1$ and $R_2$ in its interior, each of which is charged with a quantity of a contact mass such as the alkali or alkaline earth metal manganate mass disclosed and claimed in my copending application Serial No. 449,686, filed concurrently herewith.

Assuming that reaction vessel $R_1$ is on the air phase and reaction vessel $R_2$ is on the steam phase, the operation proceeds as follows:

An air compressor A discharges air into a receiver G, from which it passes by way of a conduit 11 to a T comprising two branches 13 and 15. The flow of air through the branches 13 and 15 is controlled by two inlet valve means 17 and 19, respectively. The valve means 17 comprises two interlocked valves, one in the branch conduit 13 being open and the other, in a conduit 21, being closed. The valve means 19 also comprises two interlocked valves, one in the branch conduit 15 being closed and the other, in a conduit 23, being open.

Air flows through the branch conduit 13 to a conduit 25 leading to a heat exchanger $H_1$ arranged in the furnace F above the vessel $R_1$. From there the air passes to a superheater $S_1$ arranged below the vessel $R_1$, and is then discharged into the vessel $R_1$ where it flows through the porous contact mass and is stripped of its oxygen. The hot waste gas, mainly nitrogen, passes from the outlet of the vessel $R_1$ into the heat exchanger $H_1$, in which it flows countercurrently to the incoming air and helps to preheat the latter. Waste gas then passes by way of a conduit 27 to a branch conduit 29 of another T, also including a branch conduit 31. Flow of waste gas through the branch conduits 29 and 31 is controlled by two outlet valve means 33 and 35, respectively. The valve means 33 includes two interlocked valves, one in the branch conduit 29 being open and the other, in a conduit 37, being closed. The valve means 35 also includes two interlocked valves, one in the branch conduit 31 being closed and the other, in a conduit 39, being open. As a result, the waste gas flows through the open conduit 29 into a waste conduit 41 and is discharged to the atmosphere through a back pressure valve 43. If desired, the waste gas may be collected for use.

Meanwhile, a water pump P has been pumping water from a water container W through a conduit 45 into a steam coil or flash boiler B arranged in the furnace F above the reaction vessels $R_1$ and $R_2$. The water is flashed to steam, which flows through a conduit 47 to another T comprising the two branch conduits 21 and 23. As the valve controlling the branch conduit 21 is closed, and that controlling the branch conduit 23 is open, the steam flows through the conduit 23 to a conduit 49 leading to a second heat exchanger $H_2$ in the furnace F above the vessel $R_2$. The preheated steam from there passes to a second superheater $S_2$ and then into the vessel $R_2$, where it passes through the porous contact mass and liberates gaseous oxygen.

The gaseous oxygen mixed with residual steam leaves the vessel $R_2$ and passes to the heat exchanger $H_2$, where it flows countercurrently to the entering steam and helps to preheat the latter. From there, the steam-oxygen mixture passes by way of a conduit 51 to the branch conduit 39 of another T, which also includes the branch conduit 37, through the open valve of the valve means 35, and into a conduit 53.

Steam in the steam-oxygen mixture is condensed in an air cooled condenser C, the hot condensate and non-condensable gaseous oxygen thereafter passing into the top of the water container W. Gaseous oxygen then passes to the suction side of an oxygen compressor O which compresses the oxygen to a high pressure, such as 2000 lbs./sq. in. The compressed oxygen is freed of moisture in a moisture trap 55, and in one of a pair of drying units $D_1$ and $D_2$, which may contain silica gel or any other suitable water absorbing material. The high pressure dry gaseous oxygen then flows through a back pressure valve 57 to a charging rack E having connections for charging the oxygen into cylinders or the like.

After the air and steam reactions have proceeded in the reaction vessels $R_1$ and $R_2$, respectively, for a predetermined interval, such as five minutes, the flow of the two fluids is interchanged, steam being thereafter passed through the vessel $R_1$ for deoxidizing the contact mass, and air flowing thereafter through the vessel $R_2$ for oxidizing the contact mass. This is accomplished by first simultaneously actuating the two inlet valve means 17 and 19 so that the positions of the respective valves are reversed.

Steam from the steam coil B then passes through the branch conduit 21 to the conduit 25, and thence through the heat exchanger $H_1$ and the superheater $S_1$ into the vessel $R_1$. At the same time air from the receiver G passes through the branch conduit 15 to the conduit 49, and thence through the heat exchanger $H_2$ and the superheater $S_2$ into the reaction vessel $R_2$.

The steam entering the vessel $R_1$ drives ahead of it all residual waste gas, which is discharged to the atmosphere through the waste conduit 41. The air entering the vessel $R_2$ drives ahead of it all residual steam-oxygen mixture, which passes to the conduit 53. After a predetermined time lag interval for this purging operation, the two outlet valve means 33 and 35 are actuated to reverse the positions of the respective valves, and the cycle of operation is completed with the mass in vessel R1 being deoxidized, and the mass in vessel R2 being oxidized. Steam-oxygen mixture from vessel R1 then is discharged through the branch conduit 37 to the conduit 53, and waste gas from vessel R2 is discharged through the conduit 31 to the waste conduit 41.

After a predetermined time interval, such as five minutes, the whole cycle may be repeated by again actuating the valve means 17, 19, 33 and 35 to restore them to their original positions.

In the preferred form of the process of the invention, substantially equal air and steam pressures of at least about 75 pounds per square inch (gauge) are desirable. As the rate of oxygen production increases in direct proportion to the absolute atmospheres of steam pressure, at a steam pressure of about 75 pounds per square inch gauge (equal to about six atmospheres absolute) the rate of oxygen production for a given steam flow is approximately six times as great as it would be at atmospheric pressure under otherwise identical conditions with the same mass; and conversely, the quantity of steam required per unit volume of oxygen produced is about one sixth as great at 75 pounds per square inch as at atmospheric pressure with the same mass. As the result of pressure operation, therefore, it is possible to reduce very materially the steam consumption per unit volume of oxygen produced, thus effecting a heat balance between the steam and air requirements, a decrease in the size of equipment required, and a low cost of operation. The stability of the alkali manganate contact mass is also greatly improved as a result of operation under pressure.

The main reason that the air and steam are preferably maintained at substantially equal pressures is to prevent shocks to the mass when alternating between the air and steam phases of the process. However, theoretically the air pressure may be maintained much lower than the steam pressure without reducing the rate of oxygen production. In the two reversible reactions of the types of chemical systems involved in this process, one example being represented by the equation given above for the Du Motay et al. process, the oxygen production rate is controlled by the slowest reaction in the system. This slowest reaction is the deoxidizing reaction of the steam phase, and it is for this reason that large quantities of steam are required when operating at atmospheric pressure. The use of a super-atmospheric steam pressure speeds up the steam phase of the reaction and thereby increases the rate of oxygen production. It is well to note, moreover, that even when the air pressure is equal to the steam pressure, the partial pressure of oxygen over the contact mass is only about one-fifth of the total air pressure; and it is this partial pressure of oxygen over the mass which controls the rate of the reoxidation phase of the cycle.

The improvement of the present invention, namely, operation at super-atmospheric steam and air pressures, is not limited to any particular reaction mass. It greatly improves the rate of oxygen production and the stability of the mass when oxygen is produced by alternately passing air and steam over any suitable hot mass having the ability to be oxidized by the passage of air thereover, and thereafter to be deoxidized and release oxygen during the passage of steam thereover.

In one example of the process of the invention a contact mass was prepared by sintering at a temperature of about 1920° F. a mixture of manganese dioxide, alumina, and sodium hydroxide in the proportions of 8 mols $MnO_2$ to 1 mol $Al_2O_3$ to 18 mols NaOH, corresponding theoretically to a compound having the formula $$4Na_2MnO_4.NaAlO_2$$

Samples of this mass were subjected to a cycling operation consisting of alternate five-minute phases of air and steam, while the samples were maintained at a temperature of about 1200° F. Under these conditions, the yields of oxygen in cubic feet per hour for equal weights of mass and equal steam flows were as follows:

| Operating Pressure Lbs. per Sq. In. Gauge | Oxygen Yield Cu. Ft. per Hour |
|---|---|
| 0 | .22 |
| 13.5 | .45 |
| 30 | .67 |
| 60 | 1.25 |

The process, using a mass as described above, was operated continuously for 25 days under pressure without any substantial deterioration of the mass.

A second example of the improved process was similarly performed, using a sodium manganate contact mass, prepared by first reducing manganese dioxide to an available oxygen content corresponding to $Mn_3O_4$, then mixing it with sodium hydroxide in the proportion of 2 mols of $Mn_3O_4$ to 8 mols of NaOH corresponding theoretically to a compound having theoretically the formula $2Mn_3O_4.4Na_2O$, and sintering at about 2200° F. The following yields of oxygen were obtained, expressed in cubic feet per hour for equal weights of mass:

| Operating Pressure Lbs. per Sq. In. Gauge | Oxygen Yield Cu. Ft. per Hour |
|---|---|
| 0 | .11 |
| 13.5 | .22 |

The process using a sodium manganate mass as described above in the second example, has been operated continuously for a period of ten days under pressure without any substantial deterioration of the mass.

In a third example, a contact mass was prepared in the same way as in the second example, but using KOH in place of NaOH. The following yields of oxygen were obtained, expressed in cubic feet per hour for equal weights of mass:

| Operating Pressure Lbs. per Sq. In. Gauge | Oxygen Yield Cu. Ft. per Hour |
|---|---|
| 0 | .05 |
| 75 | .33 |

The process of the invention also has been tested and proved advantageous on reaction masses containing alkali manganate plus silica up to 12% of the $MnO_2$ added. Moreover, the process is generally advantageous with masses containing chromium, manganese, lead, aluminum, molybdenum, and boron compounds, as well as with chromate and ferrate masses.

The rate of the steam phase reaction is also a function of the temperature, and has been observed to increase approximately 20% for an increase in temperature of operation from 1150° F. to 1300° F. However, it is the operation of the process at super-atmospheric pressures which constitutes the novel improvement of the present invention, regardless of the temperature used. The preferred temperature is about 1200° F., with steam and air pressures of between about 75 and about 90 pounds per square inch gauge, when using an alkali manganate contact mass.

When performing the process of producing oxygen described above, oxygen production tends to stabilize at a constant rate which may be above or below the initial production rate, depending on the nature of the contact mass employed. This constant yield rate is referred to as the "stabilized yield level." When operation of the process proceeds normally, the rate of oxygen production continues indefinitely at the stabilized level.

Due to faulty operation, the activity of the contact mass sometimes may be impaired to such an extent that the oxygen yield is greatly reduced below the stabilized level. An excessive reduction in the supply of air may effect this undesirable result, as may the use of excessive air pressures or air flows on some types of masses. Impairment of the contact mass apparently results from disturbing the chemical equilibrium, which results in a depletion in the amount of the active constituent present in the mass. Sodium manganate (or potassium manganate) apparently is the active constituent of the contact masses specifically described above.

When the activity of the contact mass is so impaired that it loses some of its ability to take up oxygen during the passage of air thereover, it may be reactivated by maintaining the mass in a hot condition and passing air into contact therewith at conditions of temperature and pressure promoting the reformation of the active constituents. This may be accomplished by increasing the air pressure above the normal operating pressure by a substantial amount. Reactivation may be performed while retaining the contact mass in situ, thus avoiding the expense, time, and annoyance of removing the mass to a special reactivation apparatus.

It has been found that, when a contact mass having impaired activity is reduced in temperature to below 1100° F. and a flowing stream of air at super-atmospheric pressure is passed into contact with the mass while maintaining the mass in a hot reactive condition constantly below 1100° F., its activity will be restored. The preferred temperature for reactivation is 950° F. or lower, and a quantity of air slightly more than that required during a single operating cycle should be used. Also, it is desirable that the pressure of the air be somewhat higher than is used during normal operation. When the operating temperature is again raised to at least 1100° F. and the air-steam cycle is resumed, the original stabilized level of oxygen production is obtained.

As an example of how reactivation is carried out, an impaired sodium manganate type contact mass was completely reactivated by reducing the temperature to 950° F. and passing air at 65 to 70 lbs./sq. in. over the mass for 8 minutes. Upon restoration of the original operating temperatures of 1200° F., and the original steam and air pressures of 60 lbs./sq. in., the original stabilized yield level was again obtained.

It is evident that the process of reactivating the contact mass may be performed while raising or lowering the temperature of the mass to place the unit in operation, or on the completion of a run, or it may be done as an interruption in the production procedure if the productive capacity has become impaired. Also, the reactivation procedure may be performed periodically to prevent the activity of the mass from becoming too impaired. Furthermore, it is to be understood that the process of reactivation is applicable to any contact mass having the ability to be oxidized by the passage of air into contact therewith, and thereafter to be deoxidized and release oxygen by the passage of steam thereover.

Although empirical formulae and names have been given to the masses to which this process is applicable, it is to be understood that there is no evidence that any or all of a particular mass has the exact formula assigned to it. The masses are prepared by sintering together their constituents in the proportions required theoretically to produce compounds of the indicated formulae, but the utlimate products may vary in while or in part from the theoretical formulae. This process, therefore, is not to be limited by any formulae or names of chemicals used herein.

I claim:

1. In a process for extracting gaseous oxygen from a mixture of oxygen with inert gas by alternately passing said mixture and steam in contact with a hot manganate type contact mass, the steps of maintaining said mass at a temperature of approximately 1200° F. while maintaining said mixture and said steam at approximately equal pressures between approximately 75 and approximately 90 lbs./sq. in. gauge during the respective periods of passage of such mixture and such steam in contact with said mass.

2. In a process for extracting gaseous oxygen from a mixture of oxygen with inert gas by alternately and successively passing said mixture and steam in contact with a hot solid contact mass having the ability to absorb oxygen from such mixture and to release the absorbed oxygen during the steam phase, said mass comprising at least one substance selected from the group consisting of manganates, chromates, and ferrates, the steps which comprise maintaining said mass at a temperature between 1100° and 1300° F. and maintaining said mixture and said steam at approximately equal pressures above about two atmospheres absolute during their respective periods of passage.

3. In a process for extracting gaseous oxygen from a mixture of oxygen with inert gas by alternately passing said mixture and steam in contact with a hot manganate type contact mass, the steps of maintaining said mass at a temperature between 1100° F. and 1300° F. while maintaining said mixture and said steam at approximately equal pressures between 75 and 90 lbs./sq. in. gauge during their respective periods of passage.

4. A process for reactivating an impaired solid manganate type contact mass of the type normally containing a substantial amount of an active constituent comprising a manganate compound of an alkali metal, the amount of said manganate compound in said mass having been so depleted by the passage of steam and air at the operating temperature and pressure that said mass has lost some of its ability to take up oxygen during the passage of air, said process comprising maintaining said mass in a hot condition and passing air into contact therewith at a pressure increased above said operating pressure to promote the reformation of said manganate compound.

5. A process for reactivating a manganate type contact mass impaired during the production of gaseous oxygen by the alternate passage of steam and air in contact therewith at super-atmospheric operating pressures and operating temperatures above 1100° F., said mass having lost some of its ability to take up oxygen during the passage of air thereover, said process comprising holding said mass at an elevated temperature constantly below 1100° F. and passing into contact therewith a flowing stream of air at a pressure greater than said operating air pressure.

6. A process for producing gaseous oxygen which comprises alternately passing flowing streams of air and steam at an operating temperature above 1100° F. and at super-atmospheric pressure in contact with a hot solid manganate type contact mass having the ability to be oxidized by the passage of air in contact therewith and thereafter to be deoxidized and release oxygen by the passage of steam in contact therewith; and, when the activity of said mass becomes so impaired that said mass loses some of its ability to take up oxygen during the passage of air, reactivating said mass by reducing the temperature thereof to below 1100° F. and passing into contact therewith a flowing stream of air at a pressure greater than said operating air pressure while holding said mass in a hot reactive condition constantly below 1100° F.

7. In a process for extracting gaseous oxygen from a mixture of oxygen with inert gas by alternately and successively passing said mixture and steam in contact with a hot solid manganate type contact mass having the ability to absorb oxygen from such mixture and to release the absorbed oxygen during the steam phase, the steps which comprise maintaining said mass at a temperature between 1100° and 1300° F. and maintaining said mixture and said steam at approximately equal pressures above about two atmospheres absolute during their respective periods of passage.

8. A process for producing gaseous oxygen which comprises alternately passing flowing streams of air and steam at approximately equal operating pressures above about two atmospheres absolute in contact with a hot solid manganate type contact mass maintained at a temperature between 1100° and 1300° F., said contact mass having the ability to be oxidized by the passage of air in contact therewith and thereafter to be deoxidized and release oxygen by the passage of steam in contact therewith; and, when the activity of said mass becomes so impaired that said mass loses some of its ability to take up oxygen during the passage of air, reactivating said mass by maintaining said mass in a hot reactive condition and passing into contact therewith a flowing stream of air at a pressure greater than said operating air pressure.

LESLIE G. JENNESS.

REFERENCES CITED

The following references are of record in the file of this patent:

UNITED STATES PATENTS

| Number | Name | Date |
| --- | --- | --- |
| 1,124,304 | Danckwardt | Jan. 12, 1915 |
| 1,244,902 | Scheller | Oct. 30, 1917 |
| 1,848,723 | Jaeger | Mar. 8, 1932 |
| 1,015,566 | Kaszner | Jan. 23, 1912 |

FOREIGN PATENTS

| Number | Country | Date |
| --- | --- | --- |
| 487,785 | Great Britain | June 23, 1938 |
| 13,959 | Great Britain | 1895 |
| 3 034 | Great Britain | 1891 |